United States Patent [19]
Kasashima et al.

[11] Patent Number: 5,910,379
[45] Date of Patent: Jun. 8, 1999

[54] HYDROGEN ABSORBING ALLOY FOR A NEGATIVE ELECTRODE OF AN ALKALINE STORAGE BATTERY

[75] Inventors: Masaki Kasashima; Noriaki Hamaya; Naofumi Shinya; Satoshi Shima, all of Fukui-ken, Japan

[73] Assignee: Shin-Etsu Chemical Co., Ltd., Tokyo, Japan

[21] Appl. No.: 09/009,501

[22] Filed: Jan. 20, 1998

[30] Foreign Application Priority Data

Nov. 6, 1997 [JP] Japan ................................. 9-304740

[51] Int. Cl.⁶ .................................................. H01M 10/34
[52] U.S. Cl. ......................... 429/59; 429/101; 429/223; 429/224; 420/900; 204/293
[58] Field of Search ............................ 420/900; 429/59, 429/100, 223, 224, 221, 220; 204/293

[56] References Cited

U.S. PATENT DOCUMENTS

| | | | |
|---|---|---|---|
| 5,306,583 | 4/1994 | Bouet et al. | 420/900 |
| 5,384,210 | 1/1995 | Furukawa | 420/900 |

FOREIGN PATENT DOCUMENTS

| | | |
|---|---|---|
| 51-13934 | 3/1976 | Japan . |
| 53-48918 | 5/1978 | Japan . |
| 54-64014 | 5/1979 | Japan . |
| 60-250558 | 12/1985 | Japan . |
| 61-233968 | 10/1986 | Japan . |
| 62-43064 | 2/1987 | Japan . |

*Primary Examiner*—Bruce F. Bell
*Attorney, Agent, or Firm*—Burns, Doane, Swecker & Mathis, L.L.P.

[57] ABSTRACT

Provided is a hydrogen absorbing alloy suitable for a negative electrode of an Ni—hydrogen storage battery effective at low temperature, more specifically, a R—Ni type of hydrogen absorbing alloy represented by a general formula $RNi_aCo_bAl_cM_d$, and with Mo content of 50 to 500 ppm wherein R expresses not less than 18 wt % Pr and one or more metals other than Pr, Ni, Co, Al and M, and M expresses one or more metals selected from the group consisting of Fe, Cr, Cu, and Mn, and a to d expresses positive numbers in the specified range Moreover, the above alloy further containing trace amounts of Mg, Ti, Pb, oxygen, carbon, and/or sulfur is provided.

16 Claims, No Drawings

HYDROGEN ABSORBING ALLOY FOR A NEGATIVE ELECTRODE OF AN ALKALINE STORAGE BATTERY

BACKGROUND OF THE INVENTION

1. Field of the Invention

The present invention relates to a hydrogen absorbing alloy, and more particularly relates to a hydrogen absorbing alloy suitable for a negative electrode of an alkaline storage battery.

2. Description of the Related Art

Since a hydrogen absorbing alloy which charged and discharged hydrogen was discovered, the application thereof has not been limited to a mere hydrogen storing means, but developed to heat pumps or batteries. Furthermore, in recent years, accompanied with the development of the electronic engineering, the miniaturization and the labor saving for electronic equipment have become important factors. Moreover, recently, a storage batteries using the hydrogen absorbing alloy have come to be used in highlands or cold zones, and batteries having an excellent low temperature property have been required.

In particular, an alkaline storage battery using a hydrogen absorbing alloy as a negative electrode, is put to practical use, and the hydrogen absorbing alloy used in that has also been improved one after another. The $LaNi_5$ alloy (reference to Japanese Patent Provisional Publication No. 51-13934) has disadvantages that it is easily cracked because of repeated charge and discharge of hydrogen, and therefore, the specific surface area of the alloy increases so that the deteriorated area thereof increases, and further, it is easily corroded by alkaline solution, while it has an advantages that the absorbed amount of hydrogen is large.

Such disadvantage has been improved by displacing part of La of the $LaNi_5$ alloy with the other rare-earth metal element such as Ce, Pr or Nd, and/or by displacing a part of Ni of the $LaNi_5$ alloy with metal such as Co, Al or Mn (reference to, for example, Japanese Patent Provisional Publication Nos. 53-48918, 54-64014, 60-250558, 61-233968, and 62-43064).

Then, an alloy for use in which part of La is displaced with Ce or the like, includes a misch metal (Mm) containing approximately 40 to 50 wt % ('wt %' is short for '% by weight') Ce, and an La-rich misch metal (Lm) containing approximately 50 to 70 wt % La and approximately 10 to 30 wt % Ce.

Generally, in a case where a $LaNi_5$ type of hydrogen absorbing alloy is used for batteries, it is important that the alloy has a large capacity, and further has a good discharge property at low temperatures, and has a long cycle life for repetition of charge and discharge.

In the above view, by displacing part of La with Ce, the object is tried to be achieved. However, the high rate discharge property at low temperatures or the discharge property is not improved, although the cycle life for repetition of charge and discharge is improved. Furthermore, it is known that displacing Ni with Co, Mn, Al or the like has effect to the efficient discharge property at ordinary temperature and the lifetime.

SUMMARY OF THE INVENTION

Accordingly, an object of the present invention is to provide a hydrogen absorbing alloy suitable for a negative electrode of an Ni—hydrogen storage battery effective at low temperatures.

Therefore, the present inventors have repeatedly investigated the synergistic action of the La site and the Ni site of a $LaNi_5$ type hydrogen absorbing alloy, and consequently, reached a hydrogen absorbing alloy for a negative electrode of an alkaline storage battery of the present invention. The alloy is mainly made from Pr and contains one or more metals other than Pr. The alloy effects an alkaline storage battery having a high capacity at low temperatures (i.e. less than 0° C., specifically −30° C. to 0° C.), a good high rate discharge property, which is performed at a large current discharge, a good discharge property, and a good cycle life as a result of adding a trace amount of Mo, a metal element such as Ti, Pb or Mg, and/or a nonmetal element such as carbon, oxygen, or sulfur.

According to the present invention, a $LaNi_5$ type of hydrogen absorbing alloy is provided, wherein the content of Mo in the hydrogen absorbing alloy is 50 to 500 ppm, and the alloy is expressed by a general formula of $RNi_aCo_bAl_cM_d$. The R comprises 18 wt % or more Pr and 82 wt % or less of one or more of metals other than Pr, Ni, Co, Al, M and Mo. The M comprises one or more metals selected from the group consisting of Fe, Cr, Cu, and Mn. The a to d are molar ratios against R (wherein R is 1) expressing positive numbers in the ranges mentioned below;

$$2.0 \leq a \leq 4.5;\ 0.3 \leq b \leq 1.0;\ 0 < c \leq 0.6;\ 0 < d \leq 0.5$$

In an embodiment of the present invention, the R may comprise 18 wt % or more Pr and 82 wt % or less of one or more rare-earth metals other than Pr.

In a further embodiment of the present invention, the hydrogen absorbing alloy may comprise at least one selected from the group consisting of 0.1 wt % or less Mg, 0.05 wt % or less Ti, and 0.05 wt % or less Pb.

In an embodiment of the present invention, a nonmetal element (at least one selected from the group consisting of not more than 0.3 wt % oxygen, not more than 0.05 wt % carbon, and not more than 0.05 wt % sulfur) may be included in the hydrogen absorbing alloy in addition to Mg, Ti, and Pb.

The hydrogen absorbing alloy of the present invention is suitable for a negative electrode of an alkaline secondary battery, which has a high capacity and a long cycle life, and which is excellent in a high rate discharge property and a discharge property at low temperatures because of the effects of trace amounts of additional elements such as Mo.

DETAILED DESCRIPTION OF PREFERRED EMBODIMENT

The $LaNi_5$ type hydrogen absorbing alloy of the present invention effects a negative electrode of alkaline storage battery, which can maintain a high capacity at low temperatures, and suppress corrosion caused by the alkali electrolyte, and has achieved improvement of the cycle life, as a result of increasing the Pr content component on the La site of the $LaNi_5$ type hydrogen absorbing alloy.

Furthermore, since by increasing the content of Pr on the La site, the dissociation equilibrium pressure can be controlled in the range suitable for an alkaline secondary battery, the amount of displacement by Mn, Al or the like on the Ni site can be made smaller than the conventional one. And the alloy can also become suitable for a negative electrode of an alkaline secondary battery, which has a high capacity and a good cycle life.

The La site of the present invention is expressed by a general formula R, which is composed of one or more rare-earth metals in addition to not less than 18 wt % Pr.

Preferably, R may comprise 18 to 55 wt % Pr and 45 to 82 wt % of one or more rare-earth metals other than Pr. If the Pr content of the R is less than 18 wt %, the effects at low temperature of the battery, expected by the present invention, may not be obtained. Furthermore, if the Pr content in the R exceeds 55 wt %, the ability to absorb hydrogen may be decreased. In the present invention, the R may further preferably comprise 20 to 45 wt % Pr. The remainder in the R may be selected from one or more rare-earth metals other than Pr.

The rare-earth metal other than Pr, comprised by the R, may be one or more rare-earth metals selected from the group consisting of La, Ce, Nd, Sm, Eu, Gd, Tb, Dy, Ho, Er, Tm, Yb, Lu, and Y. The R may preferably comprise one or more rare-earth metals selected from the group consisting of La, Ce, and Nd. The R may more preferably comprise 45 to 82 wt % La. Moreover, part of the La may be displaced with Ce or/and Nd.

Furthermore, according to the present invention, when La is comprised by R in addition to Pr, the total amount of Pr and La may be preferably 70 to 100 wt %, and the remainder in the R may comprise one or more rare-earth metals other than Pr and La. According to the present invention, it may be preferable that R comprises a combination of Pr and La, a combination of Pr, La and Ce, or a combination of Pr, La, Ce and Nd.

In the general formula $RNi_aCo_bAl_cM_d$ of the present invention, "a" may be in the range of 3.0 to 4.5 mole for the amount of Ni when the amount of R is one mole. If the amount of Ni is smaller than a value in the range, the capacity of the battery may be lowered, and if the amount of Ni is higher than a value in the range, the cycle life of the battery may be unfavorably lowered.

The "b", "c", and "d" are also expressed, hereinafter, in the molar number when the amount of R is one mole, that is, the molar ratios toward R.

Furthermore, Co or Al can improve the corrosion resistance of the hydrogen absorbing alloy, respectively The content of Co may be in the range of $0.3 \leq b \leq 1.0$, and particularly preferably in the range of $0.4 \leq b \leq 0.7$. If it is less than 0.3, the cycle life of the battery tends to decline. If it exceeds 1.0, a result may be unfavorable as regarding the high rate discharge property or the low temperature property of the battery. The Al content c may be in the range of $0 \leq c \leq 0.6$, and especially preferably in the range of $0.2 \leq c \leq 0.5$. If Al is not contained, the cycle life tends to decline, and if the content of Al exceeds 0.6, the discharge capacity may be unfavorably lowered.

The M may comprise one or more metals selected from the group consisting of Fe, Mn, Cr, and Cu. The M may be particularly preferably comprise Mn.

Addition of the M, for example, addition of Mn is effective for lowering the dissociation equilibrium pressure of hydrogen and increasing the capacity of the battery. However, since it may lower the cycle life of the battery, the amount to be added may be in the range of $0<d \leq 0.5$, and particularly preferably in the range of $0.05 \leq d \leq 0.3$. If the M is not contained, the capacity of the battery may be lowered, and if d exceeds 0.5, the cycle life of the battery may be unfavorably lowered.

Furthermore, according to the present invention, in the composition on the Ni site, the sum of a, b, c and d, a+b+c+d, may be preferably in the range of 4.5 to 5.5 so that the ability to absorb hydrogen or cycle life of the battery may further be increased Next, the effect of the trace amount of contained element to be contained by which the present invention is characterized, will be described. The Mo produces an intermetallic compound together with Co in the hydrogen absorbing alloy. The resulting intermetallic compound exists as a secondary phase, and easily becomes the starting point of the crack of the hydrogen absorbing alloy caused by expansion and shrinkage when hydrogen is charged and discharged, and improves the initial low temperature property, especially the electrical discharge property at $-20°$ C., which is required for the latest portable equipment.

The added amount of Mo may be preferably 50 to 500 ppm, and more preferably 100 to 400 ppm. If it is less than 50 ppm, the low temperature property of the battery may not be sufficient, and if it exceeds 500 ppm, the cycle life of the battery may be lowered. Particularly, according to the present invention, when not less than 18 wt % Pr is contained and 50 to 500 ppm Mo is added, the low temperature property of the battery may be improved synergistically.

The present invention is characterized in that a trace amount of Ti, Mg, Pb, O, C, and/or S is further contained in the alloy having a trace amount of Mo.

In the present invention, the alloy further containing Ti, produces an intermetallic compound of Ti and Ni, which is present mainly in the grain boundary in the matrix. It easily becomes a starting point of a crack of the hydrogen absorbing alloy caused by expansion and shrinkage when hydrogen is charged and discharged, and consequently it improves the initial low temperature property, particularly the electrical discharge property at low temperatures, which is necessary for the latest portable equipment. Furthermore, if a trace amount of carbon exists, a carbides of Ti (Ti—C) is produced, resulting in a good initial low temperature property of the battery is given as described below.

The added amount of Ti may be not more than 0.05 wt %, and preferably in the range of 0.005 to 0.05 wt %, and more preferably in the range of 0.01 to 0.04 wt %. If it is less than 0.005 wt %, the effect of the present invention may not be obtained, and if it exceeds 0.05 wt %, the cycle life of the battery may be lowered.

Furthermore, the added Mg is preferentially dissolved in the alkaline electrolyte at an extremely initial step when the alloy having Mg is assembled for an alkaline secondary battery. Consequently, the surface area of the hydrogen absorbing alloy is increased so that the low temperature property at the initial stage of the battery may be improved.

The added amount of Mg may be not more than 0.1 wt %, preferably in the range of 0.005 to 0.1 wt %, and more preferably in the range of 0.01 to 0.08 wt %. If it is less than 0.005 wt %, the effect of the present invention may not be obtained. Furthermore, if it exceeds 0.1 wt %, the cycle life may be lowered.

Furthermore, Pb is dissolved in the alkaline electrolyte when the alloy having Pb is assembled for an alkaline secondary battery. Consequently, the discharge voltage of the battery system rises and improves the discharge property at low temperature.

The content of Pb may be not more than 0.05 wt %, and preferably in the range of 0.001 to 0.05 wt %, and more preferably in the range of 0.005 to 0.04 wt %. If it is less than 0.001 wt %, the effect of the present invention may not be obtained. If the content of Pb exceeds 0.05 wt %, the voltage during charging may rise, which is unfavorable for an alkaline secondary battery.

The oxygen content in the hydrogen absorbing alloy may be not more than 0.3 wt %, preferably in the range of 0.01 to 0.3 wt %, and more preferably in the range of 0.03 to 0.2 wt %. If less than 0.01 wt %, it is so reactive that the handling may be difficult If it exceeds 0.3 wt %, the oxide thin layer on the surface of the alloy may obstruct the reaction on the surface of the alloy when used in an alkaline secondary battery, and the high rate electrical discharge property and the like are lowered.

Furthermore, the adjustment of the oxygen content in the hydrogen absorbing alloy can easily be performed by controlling the atmosphere during the manufacturing process.

The trace amount of carbon preferentially bonds with the rare-earth elements and Ti to produce carbides, which are present mainly in the grain boundary in the matrix, and easily becomes the starting point of the crack of the hydrogen absorbing alloy caused by expansion and shrinkage when hydrogen is charged and discharged, resulting in the improvement of the initial low temperature property, especially the efficient electrical discharge property at low temperature or the like, which is required for the latest portable equipment.

The added amount of carbon may be not more than 0.05 wt %, preferably in the range of 0.005 to 0.05 wt %, and more preferably in the range of 0.01 to 0.04 wt %. If the added amount of carbon is less than 0.005 wt %, the amount of the carbides such as (rare-earth metal)—C or Ti—C to be formed may be very low. If the added amount of carbon exceeds 0.05 wt %, the amount present in the grain boundary of Ti—C or (rare-earth metal)—C is so large that the characteristics of the present invention may not be fully obtained.

Sulfur may be easily opt to form specifically sulfides together with Ni and Co in the hydrogen absorbing alloy, and if the sulfur content is high, the generated Ni and Co sulfides become passive state and tends to lower the high rate electrical discharge property, and if the sulfur content is low, Ni and Co are dissolved in the alkaline electrolyte when the alloy is placed in an alkaline secondary battery, and the decrease of electrolyte may tend to lower the cycle life. Accordingly, the sulfur content may be not more than 0.05 wt %, and preferably in the range of 0.001 to 0.05 wt %, and more preferably in the range of 0.005 to 0.04 wt %.

In the present invention, it is preferable that particularly on the La site, not less than 18 wt % Pr and one or more rare-earth metals other than Pr are contained, and 50 to 500 ppm Mo is contained, and further, a non-rare-earth metal of Ti, Mg and/or Pb, and a non-metal of O, C and/or S in the range of a specified amount are contained.

Although the present invention provides an alloy with the above composition, a metal element or the like other than the above elements may be further added to enhance the effect.

A hydrogen absorbing alloy of the present invention can easily be obtained by producing $RNi_aCo_bAl_cM_d$ in a well known method, then melting with trace amounts of elements such as Mo. Specifically, specified amounts of elements are weighed respectively, and after being melted under vacuum (at the low pressure of not more than 0.01 Torr) or at 200 to 800 Torr in an inert gas such as argon, helium, neon, etc, in a high frequency melting furnace or the like by using a crucible or the like, they are cast at 1300 to 1600° C. into iron mold or the like. Furthermore, heat treatment for the obtained alloy is performed for 5 to 20 hours at 800 to 1200° C. under vacuum (at the low pressure of not more than 0.01 Torr) or in an inert gas such as argon, helium, neon, etc. (under the pressure of 600 to 1000 Torr).

The hydrogen absorbing alloy produced by the above method is crushed by an impact type or grinding type crusher in an inert gas such as argon, helium, neon, $N_2$, etc, so that the alloy powder with the average grain diameter of 5 to 50 μm may easily be obtained.

The active materials to be filled in the electrode are composed of an alloy and a binder, and they can easily be made to be an electrode in such a process that by using the binder such as polyvinyl alcohol, celluloses such as carboxymethyl cellulose, methyl cellulose, PTFE, polyethylene oxide, or polymer latex, the alloy is mixed to be paste, and is filled in a three-dimensional conductive substrate such as a nickel foam or a nickel fiber, or a two-dimensional conductive base material such as a punched metal.

The amount of the binder to be used may be 0.1 to 20 parts by weight per 100 parts by weight of alloy. An alkali storage battery using a hydrogen absorbing alloy of the present invention as a negative electrode, has a high capacity, the long cycle life for repetition of electrical charge and discharge, and the high rate discharge property and the discharge property at low temperature are excellent.

By using Examples, the detailed description of the present invention will further be given below, but the present invention is not limited to the examples.

EXAMPLES 1 TO 29, COMPARISON EXAMPLES 1 TO 8

Each of La (purity: 99 wt % or more), Ce (purity: 99 wt % or more), Pr (purity: 99 wt % or more), Nd (purity: 99 wt % or more), Ni (purity: 99 wt % or more), Co (purity: 99 wt % or more), Mn (purity: 99 wt % or more), and Al (purity: 99 wt % or more), was weighed respectively, and mixed so as to obtain the compositions shown in Tables 1 to 3.

In Tables 1 to 3, the blending was performed by such mole ratios that the sum of the Ni site (Ni, Co, Al, Mn) was 5.0 when the sum of the R site, that is, of the R site (La, Ce, Pr, Nd) was 1.0. The columns of additional elements' in Tables 1 to 3 show the ratios of the elements to the whole alloy by ppm or wt %.

Furthermore, the additional element such as Mo was added, and heat-melting (1400° C.) was performed by high frequency melting, and further, heat treatment was performed for five hours at 900° under the atmosphere of 760 Torr argon gas, and the hydrogen absorbing alloys with the compositions of Tables 1 to 3 were produced.

The obtained alloy was pulverized by a impact type pulverizer. It was pulverized so that the average grain diameter may be 35 μm, and it is made to be powder of a hydrogen absorbing alloy.

As for the amount of oxygen, in each of the unit operations of high frequency melting, heat treatment, and crushing, the content of oxygen in the inert gas (Ar) is controlled so as to obtain a hydrogen absorbing alloy with a specified amount of oxygen.

The powder was mixed with an aqueous solution of 3 weight % polyvinyl alcohol (average degree of polymerization: 2000, degree of saponification: 98 mol %) at the ratios of 10 g powder to 2.5 g solution, and resulted in paste. The paste was filled in a porous foamed nickel at the ratio of 30 vol %, dried, and then pressed at a thickness of 0.05 to 1.0 mm. Next, a lead wire was attached to the pole plate, and a negative electrode was produced.

A sintered type electrode made of foamed metal type nickel was used for a positive electrode, and wrapped with the negative electrode through a separator made of polypropylene, and immersed in the electrolytic solution of 6N KOH so as to assemble a battery.

Discharge property of the obtained battery was measured according to Japanese Industrial Standard C 8705.

The obtained battery was subjected to the charging of 120 % to the negative electrode capacity at 0.1 C, and after one hour of rest, the battery was subjected to the discharging until the battery voltage becomes 0.6 V at 0.2 C. After repeating the cycles five times, the high rate discharge property and the low temperature discharge property (1 C discharging at −10° C. and −18° C.) were measured. The high rate discharge property was measured at 3C as shown in Tables 4 to 5. The discharge property shows the discharge amount to the negative electrode capacity and IC means a discharge for 1 g of alloy metal at 300 mA/h for 1 hour, while 3C means discharge for 1 g of alloy metal at 900 mA/h for 1 hour.

The cycle life is the ratio of the capacity at the 200th cycle to the capacity at the fifth cycle after the cycle is repeated 200 times. The compared examples 1 to 8 were also subjected to the battery tests after the alloys had been produced similarly to the performed examples. The results are shown in Tables 4 and 5.

It is obvious in Tables 4 and 5 that not only usual 0.2C discharge (60 mA/h) but also high rate discharge property, which is performed at large current discharges of 1C (300 mA/h) and 3C (900 mA/h), are good according to the present invention.

TABLE 1 compositions of hydrogen absorbing alloy

| Samples Example No. | R (wt %/R) | | | | Ni site (molar ratio) | | | | additional elements | | | | | | |
|---|---|---|---|---|---|---|---|---|---|---|---|---|---|---|---|
| | La | Ce | Pr | Nd | Ni | Co | Al | Mn | Mo (ppm) | Mg (wt %) | Ti (wt %) | Pb (wt %) | O (wt %) | C (wt %) | S (wt %) |
| 1  | 70 | 10 | 20 | 0 | 3.7 | 0.7 | 0.4 | 0.2 | 300 | 0.08 | 0.03 | 0.005 | 0.1  | 0.02  | 0.01 |
| 2  | 60 | 10 | 25 | 5 | 3.7 | 0.7 | 0.4 | 0.2 | 300 | 0.01 | 0.03 | 0.005 | 0.1  | 0.02  | 0.01 |
| 3  | 50 | 20 | 25 | 5 | 3.7 | 0.7 | 0.4 | 0.2 | 300 | 0.08 | 0.01 | 0.005 | 0.1  | 0.01  | 0.01 |
| 4  | 60 | 10 | 35 | 5 | 3.7 | 0.7 | 0.4 | 0.2 | 300 | 0.08 | 0.04 | 0.005 | 0.1  | 0.04  | 0.01 |
| 5  | 80 | 0  | 20 | 0 | 3.7 | 0.7 | 0.4 | 0.2 | 300 | 0.08 | 0.03 | 0.005 | 0.1  | 0.02  | 0.01 |
| 6  | 50 | 10 | 40 | 0 | 3.7 | 0.7 | 0.4 | 0.2 | 300 | 0.08 | 0.03 | 0.03  | 0.1  | 0.02  | 0.01 |
| 7  | 60 | 0  | 40 | 0 | 3.7 | 0.7 | 0.4 | 0.2 | 300 | 0.08 | 0.03 | 0.005 | 0.1  | 0.02  | 0.01 |
| 8  | 70 | 10 | 20 | 0 | 3.8 | 0.6 | 0.4 | 0.2 | 300 | 0.08 | 0.03 | 0.005 | 0.03 | 0.02  | 0.01 |
| 9  | 60 | 10 | 25 | 5 | 3.8 | 0.6 | 0.4 | 0.2 | 300 | 0.08 | 0.03 | 0.005 | 0.2  | 0.02  | 0.01 |
| 10 | 50 | 20 | 25 | 5 | 3.8 | 0.6 | 0.4 | 0.2 | 300 | 0.08 | 0.03 | 0.005 | 0.1  | 0.02  | 0.005 |
| 11 | 60 | 10 | 35 | 5 | 3.8 | 0.6 | 0.5 | 0.1 | 300 | 0.08 | 0.03 | 0.005 | 0.1  | 0.02  | 0.04 |
| 12 | 80 | 0  | 20 | 0 | 3.8 | 0.6 | 0.5 | 0.1 | 300 | 0.08 | 0.03 | 0.005 | 0.1  | 0.02  | 0.01 |
| 13 | 50 | 10 | 40 | 0 | 3.8 | 0.6 | 0.5 | 0.1 | 300 | 0.08 | 0.03 | 0.005 | 0.1  | 0.02  | 0.01 |
| 14 | 60 | 0  | 40 | 0 | 3.8 | 0.6 | 0.5 | 0.1 | 300 | 0.08 | 0.03 | 0.005 | 0.1  | 0.02  | 0.01 |
| 15 | 70 | 10 | 20 | 0 | 3.7 | 0.7 | 0.4 | 0.2 | 60  | 0.08 | 0.03 | 0.005 | 0.1  | 0.02  | 0.01 |

TABLE 2 compositions of hydrogen absorbing alloy

| Samples Example No. | R (wt %/R) | | | | Ni site (molar ratio) | | | | additional elements | | | | | | |
|---|---|---|---|---|---|---|---|---|---|---|---|---|---|---|---|
| | La | Ce | Pr | Nd | Ni | Co | Al | Mn | Mo (ppm) | Mg (wt %) | Ti (wt %) | Pb (wt %) | O (wt %) | C (wt %) | S (wt %) |
| 16 | 70 | 10 | 20 | 0 | 3.7 | 0.7 | 0.4 | 0.2 | 100 | 0.08  | 0.03  | 0.005  | 0.1   | 0.02  | 0.01 |
| 17 | 70 | 10 | 20 | 0 | 3.7 | 0.7 | 0.4 | 0.2 | 400 | 0.08  | 0.03  | 0.005  | 0.1   | 0.02  | 0.01 |
| 18 | 70 | 10 | 20 | 0 | 3.7 | 0.7 | 0.4 | 0.2 | 300 | 0.001 | 0.03  | 0.005  | 0.1   | 0.02  | 0.01 |
| 19 | 70 | 10 | 20 | 0 | 3.7 | 0.7 | 0.4 | 0.2 | 300 | 0.15  | 0.03  | 0.005  | 0.1   | 0.02  | 0.01 |
| 20 | 70 | 10 | 20 | 0 | 3.7 | 0.7 | 0.4 | 0.2 | 300 | 0.08  | 0.003 | 0.005  | 0.1   | 0.02  | 0.01 |
| 21 | 70 | 10 | 20 | 0 | 3.7 | 0.7 | 0.4 | 0.2 | 300 | 0.08  | 0.07  | 0.005  | 0.1   | 0.02  | 0.01 |
| 22 | 70 | 10 | 20 | 0 | 3.7 | 0.7 | 0.4 | 0.2 | 300 | 0.08  | 0.03  | 0.0005 | 0.1   | 0.02  | 0.01 |
| 23 | 70 | 10 | 20 | 0 | 3.7 | 0.7 | 0.4 | 0.2 | 300 | 0.08  | 0.03  | 0.007  | 0.1   | 0.02  | 0.01 |
| 24 | 70 | 10 | 20 | 0 | 3.7 | 0.7 | 0.4 | 0.2 | 300 | 0.08  | 0.03  | 0.005  | 0.007 | 0.02  | 0.01 |
| 25 | 70 | 10 | 20 | 0 | 3.7 | 0.7 | 0.4 | 0.2 | 300 | 0.08  | 0.03  | 0.005  | 0.45  | 0.02  | 0.01 |
| 26 | 70 | 10 | 20 | 0 | 3.7 | 0.7 | 0.4 | 0.2 | 300 | 0.08  | 0.03  | 0.005  | 0.1   | 0.003 | 0.01 |
| 27 | 70 | 10 | 20 | 0 | 3.7 | 0.7 | 0.4 | 0.2 | 300 | 0.08  | 0.03  | 0.005  | 0.1   | 0.07  | 0.01 |
| 28 | 70 | 10 | 20 | 0 | 3.7 | 0.7 | 0.4 | 0.2 | 300 | 0.08  | 0.03  | 0.005  | 0.1   | 0.02  | 0.0007 |
| 29 | 70 | 10 | 20 | 0 | 3.7 | 0.7 | 0.4 | 0.2 | 300 | 0.08  | 0.03  | 0.005  | 0.1   | 0.02  | 0.07 |

TABLE 3 compositions of hydrogen absorbing alloy

| Samples Comparative Example No. | R (wt %/R) | | | | Ni site (molar ratio) | | | | additional elements | | | | | | |
|---|---|---|---|---|---|---|---|---|---|---|---|---|---|---|---|
| | La | Ce | Pr | Nd | Ni | Co | Al | Mn | Mo (ppm) | Mg (wt %) | Ti (wt %) | Pb (wt %) | O (wt %) | C (wt %) | S (wt %) |
| 1 | 70 | 10 | 15 | 5  | 3.6 | 0.7 | 0.4 | 0.3 | 300 | 0.08 | 0.03 | 0.005 | 0.1 | 0.02 | 0.01 |
| 2 | 70 | 20 | 10 | 10 | 3.6 | 0.7 | 0.4 | 0.3 | 300 | 0.08 | 0.03 | 0.005 | 0.1 | 0.02 | 0.01 |
| 3 | 80 | 10 | 10 | 0  | 3.7 | 0.7 | 0.4 | 0.2 | 300 | 0.08 | 0.03 | 0.005 | 0.1 | 0.02 | 0.01 |
| 4 | 90 | 0  | 10 | 0  | 3.7 | 0.7 | 0.4 | 0.2 | 300 | 0.08 | 0.03 | 0.005 | 0.1 | 0.02 | 0.01 |
| 5 | 70 | 10 | 20 | 0  | 3.7 | 0.7 | 0.4 | 0.2 | 10  | 0.08 | 0.03 | 0.005 | 0.1 | 0.02 | 0.01 |
| 6 | 70 | 10 | 20 | 0  | 3.7 | 0.7 | 0.4 | 0.2 | 40  | 0.08 | 0.03 | 0.005 | 0.1 | 0.02 | 0.01 |

TABLE 3-continued

Samples: compositions of hydrogen absorbing alloy

| Comparative Example No. | R (wt %/R) La | Ce | Pr | Nd | Ni site (molar ratio) Ni | Co | Al | Mn | additional elements Mo (ppm) | Mg (wt %) | Ti (wt %) | Pb (wt %) | O (wt %) | C (wt %) | S (wt %) |
|---|---|---|---|---|---|---|---|---|---|---|---|---|---|---|---|
| 7 | 70 | 10 | 20 | 0 | 3.7 | 0.7 | 0.4 | 0.2 | 600 | 0.08 | 0.03 | 0.005 | 0.1 | 0.02 | 0.01 |
| 8 | 70 | 10 | 20 | 0 | 3.7 | 0.7 | 0.4 | 0.2 | 800 | 0.08 | 0.03 | 0.005 | 0.1 | 0.02 | 0.01 |

TABLE 4

| Samples Example No. | high rate discharge property 20° C. 3C discharge mAh/g | discharge property at low temperature −10° C. 1C discharge mAh/g | discharge property at low temperature −18° C. 1C discharge mAh/g | capacity at 5th cycle 20° C. 0.2C discharge mAh/g | capacity at 200th cycle 20° C. 0.2C discharge mAh/g | cycle life (20° C., 0.2C) ratios of capacity at 200th cycle to capacity at 5th cycle |
|---|---|---|---|---|---|---|
| 1 | 172 | 233 | 121 | 296 | 275 | 0.93 |
| 2 | 174 | 237 | 124 | 294 | 276 | 0.94 |
| 3 | 163 | 230 | 117 | 289 | 275 | 0.95 |
| 4 | 181 | 241 | 126 | 292 | 272 | 0.93 |
| 5 | 185 | 262 | 132 | 312 | 287 | 0.92 |
| 6 | 168 | 212 | 112 | 289 | 272 | 0.94 |
| 7 | 177 | 221 | 116 | 292 | 274 | 0.94 |
| 8 | 176 | 267 | 132 | 297 | 270 | 0.91 |
| 9 | 174 | 252 | 135 | 296 | 272 | 0.92 |
| 10 | 181 | 255 | 127 | 289 | 269 | 0.93 |
| 11 | 172 | 252 | 125 | 288 | 268 | 0.93 |
| 12 | 191 | 257 | 137 | 309 | 278 | 0.90 |
| 13 | 177 | 258 | 122 | 286 | 266 | 0.93 |
| 14 | 172 | 261 | 128 | 289 | 272 | 0.94 |
| 15 | 169 | 230 | 120 | 294 | 276 | 0.94 |
| 16 | 177 | 238 | 123 | 297 | 276 | 0.93 |
| 17 | 178 | 240 | 127 | 298 | 277 | 0.93 |
| 18 | 167 | 211 | 105 | 297 | 276 | 0.93 |
| 19 | 172 | 223 | 117 | 294 | 259 | 0.88 |
| 20 | 163 | 227 | 112 | 297 | 276 | 0.93 |
| 21 | 183 | 238 | 127 | 296 | 263 | 0.89 |
| 22 | 174 | 231 | 101 | 293 | 275 | 0.94 |
| 23 | 175 | 227 | 115 | 297 | 258 | 0.87 |
| 24 | 177 | 235 | 128 | 296 | 275 | 0.93 |
| 25 | 170 | 203 | 103 | 295 | 266 | 0.90 |
| 26 | 174 | 201 | 98 | 298 | 277 | 0.93 |
| 27 | 176 | 227 | 120 | 292 | 263 | 0.90 |
| 28 | 177 | 225 | 129 | 294 | 262 | 0.89 |
| 29 | 175 | 227 | 101 | 296 | 272 | 0.92 |

TABLE 5

| Samples Comparative Example No. | high rate discharge property 20° C. 3C discharge mAh/g | discharge property at low temperature −10° C. 1C discharge mAh/g | discharge property at low temperature −18° C. 1C discharge mAh/g | capacity at 5th cycle 20° C. 0.2C discharge mAh/g | capacity at 200th cycle 20° C. 0.2C discharge mAh/g | cycle life (20° C., 0.2C) ratios of capacity at 200th cycle to capacity at 5th cycle |
|---|---|---|---|---|---|---|
| 1 | 168 | 215 | 73 | 287 | 261 | 0.91 |
| 2 | 173 | 205 | 47 | 295 | 277 | 0.94 |
| 3 | 192 | 212 | 91 | 308 | 262 | 0.85 |
| 4 | 197 | 256 | 152 | 334 | 261 | 0.78 |
| 5 | 163 | 235 | 57 | 296 | 272 | 0.92 |
| 6 | 172 | 211 | 58 | 297 | 279 | 0.94 |
| 7 | 192 | 223 | 127 | 295 | 239 | 0.81 |
| 8 | 201 | 245 | 138 | 298 | 235 | 0.79 |

We claim:

1. A hydrogen absorbing alloy for a negative electrode of an alkaline storage battery represented by a general formula $RNi_aCo_bAl_cM_d$ and containing 50 to 500 ppm of Mo, wherein R comprises 18 wt % or more Pr and 82 wt % or less of one or more metals other than Pr, Ni, Co, Al, M and Mo;

M comprises one or more metals selected from the group consisting of Fe, Cr, Cu, and Mn,; each of a to d denotes a positive number expressing a molar ratio to R, and $3.0 \leq a \leq 4.5$; $0.3 \leq b \leq 1.0$; $0 < c \leq 0.6$; $0 < d \leq 0.5$.

2. A hydrogen absorbing alloy for a negative electrode of an alkaline storage battery according to claim 1 wherein said R comprises 18 wt % or more Pr and 82 wt % or less of one or more rare-earth metals other than Pr.

3. A hydrogen absorbing alloy for a negative electrode of an alkaline storage battery according to claim 2, further comprising at least one selected from the group consisting of 0.1 wt % or less Mg, 0.05 wt % or less Ti, and 0.05 wt % or less Pb.

4. A hydrogen absorbing alloy for a negative electrode of an alkaline storage battery according to claim 3, further comprising at least one selected from the group consisting of 0.3 wt % or less oxygen, 0.05 wt % or less carbon, and 0.05 wt % or less sulfur.

5. A negative electrode of and alkaline storage battery using said hydrogen absorbing alloy for a negative electrode of an alkali storage battery according to claim 4.

6. A hydrogen absorbing alloy for a negative electrode of an alkaline storage battery according to claim 3, further g 0.01 to 0.3 wt % oxygen, 0.005 to 0.05 wt % carbon, to 0.05 wt % sulfur.

7. A negative electrode of and alkaline storage battery using said hydrogen absorbing alloy for a negative electrode of an alkali storage battery according to claim 3.

8. A hydrogen absorbing alloy for a negative electrode of an alkaline storage battery according to claim 2 wherein said R comprises 18 wt % or more Pr and 82 wt % or less of one or more metals selected from the group consisting of La, Ce and Nd.

9. A hydrogen absorbing alloy for a negative electrode of an alkaline storage battery according to claim 2 wherein said R comprises 18 wt % or more Pr and 82 wt % or less La.

10. A hydrogen absorbing alloy for a negative electrode of an alkaline storage battery according to claim 2 wherein said R comprises 18 wt % or more Pr and 82 wt % or less metals of La and Ce.

11. A hydrogen absorbing alloy for a negative electrode of an alkaline storage battery according to claim 2 wherein said R comprises 18 wt % or more Pr and 82 wt % or less metals of La, Ce and Nd.

12. A hydrogen absorbing alloy for a negative electrode of an alkaline storage battery according to claim 2 wherein said R comprises 18 to 55 wt % Pr.

13. A hydrogen absorbing alloy for a negative electrode of an alkaline storage battery according to claim 2, wherein the content of said Mo is 100 to 400 ppm.

14. A hydrogen absorbing alloy for a negative electrode of an alkaline storage battery according to claim 2, further comprising 0.005 to 0.1 wt % Mg, 0.005 to 0.05 wt % Ti, and 0.001 to 0.005 wt % Pb.

15. A negative electrode of and alkaline storage battery using said hydrogen absorbing alloy for a negative electrode of an alkali storage battery according to claim 2.

16. A negative electrode of and alkaline storage sing said hydrogen absorbing alloy for a negative of an alkali storage battery according to claim 1.

* * * * *